May 25, 1926.

E. G. GEBAUER 1,586,423

RECORDING DEVICE FOR METERS

Filed Sept. 11, 1924

Inventor:
Emil G. Gebauer.

By Milo B. Stevens Co.

Attorneys

Patented May 25, 1926.

1,586,423

UNITED STATES PATENT OFFICE.

EMIL G. GEBAUER, OF CHICAGO, ILLINOIS.

RECORDING DEVICE FOR METERS.

Application filed September 11, 1924. Serial No. 737,202.

This invention relates to meters for the measurement of gas, electricity or other fluids, and more particularly to the indicating element thereof, it being the object of the present invention to provide an adjunct to such meters whereby the reading at any time may be recorded at will on a record card.

As is well known, meters for the above classes of service are generally located in basements, lofts, storage rooms and like places where access to the meter is not good and light is poor, or even absent. The periodical inspection of meters therefore entails some hardship, and mistakes in readings are often made, leading to dispute when bills are rendered. In accomplishing the primary object outlined above, the invention eliminates the necessity of reading the meter and the uncertainty in that connection.

Another object of the invention is to provide a device of this kind which is of relative simplicity and requires no skill to operate.

With these objects in view, and others which will become apparent in the course of the following description, the invention embodies a novel combination and arrangement of parts covered in principle in the appended claims, attention being directed to the accompanying drawing, in which Figure 1, is an elevation of the device showing it appended to a typical gas meter, of which the showing is but fragmental;

Figure 1:
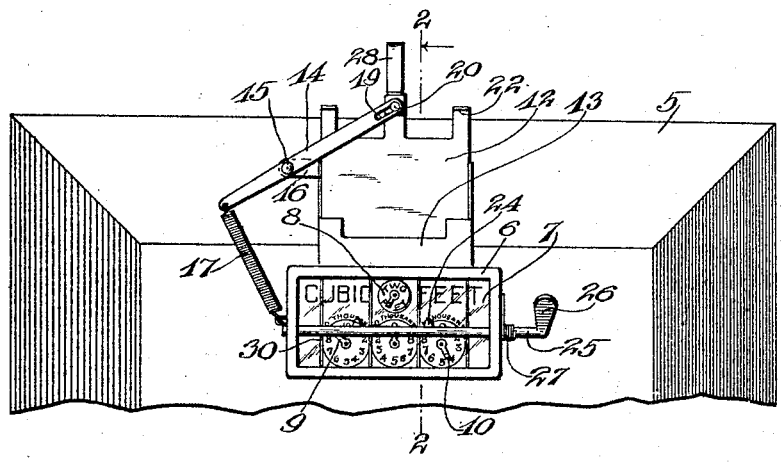

Referring specifically to the drawing, 5 denotes the upper part of a typical gas meter, 6 the frame of the indicator thereof, 7 the glass window held in the frame and 8 the usual series of indicating dials. The pointers 9 of these dials are operated by an internal gearing, but this gearing has not been shown, since it has no direct bearing on the invention. The operation of the gearing remains as usual, as well as the position of the dials 8 and pointers 9.

In order that a given position of the pointers may be recorded as outlined above, the outer ends thereof instead of coming to a point are bent out to form lugs 10. These co-operate with a fac-simile dial legend 8ª on a record card 11—shown in Figure 3—to record the position of the pointers thereon, this action consisting of pressing the record card against the lugs so as to receive an impression therefrom. It will thus be seen that, with the record card exactly opposite the series of dials 8, the respective impressions of the pointer lugs 10 will cause a reproduction of their position on the record card, which is then removed to the office of the service company for use in billing the customer or proving the meter reading at the time the record was taken.

Figures 2, 3:
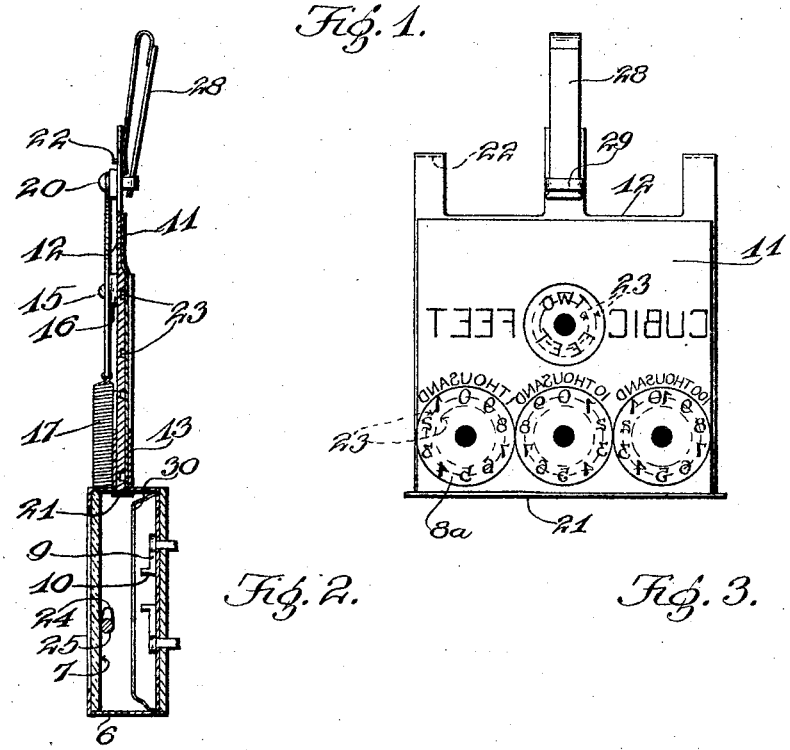
Figure 2 is a section on the line 2—2 of Figure 1.
Figure 3 is a rear elevation showing more clearly the record card referred to and its support.

In Figure 3, the rear face of record card is shown it being the face which engages the pointer lugs 10. Of necessity, the dial readings on this face must be a negative facsimile of the original dial readings of the meter, so that the position of the pointers at a given time will read the same in figures on both sets of dials. If desired, however, the record may be made a positive copy of the original dial series, providing the reverse side of the record card as the one to engage the pointer lug 10. The print or impression of the latter would, of course, appear more distinct and suggest a more faithful image of the original dial series, if the negative form of record card were used in preference to the positive form.

The record card 11, is adapted to be carried by a metal slide 12 which is positioned to work down into—and up out of—the indicator frame or housing 6 with the guidance of a sheath 13 forming an upward continuance of the frame. The slide is normally held in high or inactive position—as shown—by a lever 14 medially fulcrumed at 15 to a projection 16 of the sheath 13. The outer end of the lever is drawn downwardly by a spring 17 hooked to an eye off one end of the frame 6, and the inner end of the lever is slotted at 19 to receive a pin at the top of the slide, so that the connection will not bind when the lever draws up the slide.

The upper section of the frame 6 is of necessity slotted to permit the movement of the slide, and the latter is limited in its upward stroke by a shoe 21 at the bottom. This shoe is a reinforced rubber strip which not only acts as a stop to terminate the upward movement of the slide, but as a seal to prevent leakage or escape of any gas from the frame or housing 6 in case the meter is one for gas and some gas is present in the housing 6.

The slide is formed with outbent flanges 22 which act as stops against the sheath 13 to limit the descent of the slide. The latter is of relatively thick material to permit the incision into its rear face of a series of circular grooves 23 corresponding in position and size to the respective orbits of the pointer lugs 10 previously referred to. Thus, with the record card 11 positioned against the rear face of the slide, and the latter dropped to recording position, it will be seen that pressure of the slide in the direction of the lugs 10 will allow the yielding of the record card stock into the respective grooves 23 at the points of contact with the lugs, so that the impression of the latter will be evident from the indentations of the record card stock. The pressure of the slide to accomplish this result is produced by the side lugs 24 of a rockshaft 25 extending across the interior of the frame 6, the rockshaft having an external handle 26 and a torsion spring 27 to normally turn the shaft with its lugs abutting the window 7, so that they will not be in the path of the descending slide 12. When the latter is down, however, pressure against the handle 26 will cause the lugs 24 to impinge on the slide to accomplish the result described.

That part of the slide 12 which is above the grooves 23 is relatively thinner to receive the upper edge of the record card 11. The latter is made fast to the slide by a wedge-clamp 28 simulating a pair of spring tongs, the outer leg of which presses on the card as the clamp is slid down through a strap 29 on the back of the slide. The clamp is then used as a handle with which to push down the slide when a reading is to be taken.

Next inside of the record card when in recording position are a number of vertical spring wires 30 spanning the interior of the frame 6, these flexing when the card advances on the pointer lugs 10, but returning to normal position when the pressure is released, and therefore backing the card away from the lugs in case it has a tendency to adhere to them.

It will thus be seen that a device is had which faithfully records the meter reading at any time, yet is not a part of the meter proper, nor interferes with or affects the operation of the same. Being limited to the indicating arrangement, it is readily adaptable to any device which has a dial indicator, whether it is a gas, electricity or water meter, or a gage, scale or other variable measuring device. The preferred construction has been shown in the drawing, but it will be evident that many minor changes may be made, or equivalents substituted, without departing from the principle and scope of the invention.

I claim:—

1. A recording mechanism for use in connection with meters comprising a housing adapted to be extended over the dials of a meter and having a sheath, a slide movable through said sheath and having the inner portion thereof provided with a strip adapted to flatly engage the housing at its point of connection with the sheath to establish a fluid tight connection at the point where the sheath joins the housing whereby to prevent fluid from escaping between the slide and the sheath.

2. In a recording device for meters, the combination of a plurality of indicating hands having laterally directed projections, cards adapted to be directly engaged and indented by said projections, and a combined movable support and backing for said cards, said combined movable support and backing being provided with annular grooves to receive said projections and that portion of the card which is indented by said laterally directed projections.

3. A recording mechanism for use in connection with meters comprising a housing adapted to be extended over the dials of a meter and having a sheath, a slide movable through said sheath, an indicating card carried by said slide, a lever fulcrumed to said sheath and having connection with said slide, and a spring associated with said lever and urging said slide to elevated position.

4. A recording mechanism for use in connection with meters comprising a housing adapted to be extended over the dials of a meter and having a sheath, a slide movable through said sheath, an indicating card carried by said slide, a lever fulcrumed to said sheath and having connection with said slide, and a spring associated with said lever and urging said slide to elevated position, the lower portion of said slide being provided with means engaging said housing at its point of connection with the sheath and establishing a fluid tight connection between the sheath and the housing when the slide is in elevated position.

5. In a recording device for meters, the combination with a housing adapted to be positioned over the indicating dials of a meter and having a sheath, a slide movable through said sheath and into said housing and having one end thereof provided with a transverse strip adapted to engage a portion of said housing to establish a fluid tight connection between the housing and the sheath when the slide is in elevated position, and spring means normally holding said slide in an elevated position and normally holding said strip in fluid tight contact with said housing.

In testimony whereof I affix my signature.

EMIL G. GEBAUER.